(12) United States Patent
Zhou et al.

(10) Patent No.: US 12,555,366 B2
(45) Date of Patent: Feb. 17, 2026

(54) SEMANTIC SEGMENTATION NEURAL NETWORK FOR POINT CLOUDS

(71) Applicant: Waymo LLC, Mountain View, CA (US)

(72) Inventors: Yin Zhou, San Jose, CA (US); Ruizhongtai Qi, Mountain View, CA (US); Dragomir Anguelov, San Francisco, CA (US); Minghua Liu, La Jolla, CA (US); Boqing Gong, Bellevue, WA (US)

(73) Assignee: Waymo LLC, Mountain View, CA (US)

( * ) Notice: Subject to any disclaimer, the term of this patent is extended or adjusted under 35 U.S.C. 154(b) by 387 days.

(21) Appl. No.: 17/945,325

(22) Filed: Sep. 15, 2022

(65) Prior Publication Data

US 2024/0096076 A1   Mar. 21, 2024

(51) Int. Cl.
*G06V 10/82* (2022.01)
*G06V 10/80* (2022.01)

(52) U.S. Cl.
CPC .............. *G06V 10/82* (2022.01); *G06V 10/80* (2022.01)

(58) Field of Classification Search
CPC ........ G06V 10/82; G06V 10/80; G06V 10/22; G06V 20/56; G06V 20/70
USPC ........... 382/100, 103, 157, 173, 228; 706/21
See application file for complete search history.

(56) References Cited

U.S. PATENT DOCUMENTS

| | | | | |
|---|---|---|---|---|
| 11,004,202 B2* | 5/2021 | Tchapmi | ............... | G06N 3/045 |
| 11,022,693 B1* | 6/2021 | Allais | ................... | G06V 10/82 |
| 11,410,388 B1* | 8/2022 | Taghavi | ............. | G06V 10/7747 |
| 11,694,333 B1* | 7/2023 | Knuffman | ............ | G06V 10/454 |
| | | | | 382/154 |
| 11,810,364 B2* | 11/2023 | RoyChowdhury | ........................ | |
| | | | | G01C 21/3822 |
| 2017/0316281 A1* | 11/2017 | Criminisi | ............ | G06F 18/2148 |
| 2018/0365835 A1* | 12/2018 | Yan | ......................... | G06T 7/143 |
| 2021/0004021 A1* | 1/2021 | Zhang | ..................... | G06T 19/00 |

(Continued)

OTHER PUBLICATIONS

Dillencourt et al., "A general approach to connected-component labeling for arbitrary image representations," Journal of the ACM (JACM), Apr. 1, 1992, 39(2):253-280.

(Continued)

*Primary Examiner* — Kathleen Y Dulaney

(74) *Attorney, Agent, or Firm* — Fish & Richardson P.C.

(57) ABSTRACT

Methods, systems, and apparatus, including computer programs encoded on a computer storage medium, for training a semantic segmentation neural network for point clouds. One of the methods includes: obtaining a plurality of training points divided into a respective plurality of components; obtaining, for each of the respective plurality of components, data identifying a ground truth category for one or more labeled point; processing each training points using a semantic segmentation neural network to generate a semantic segmentation that includes a respective score for each of the plurality of categories; determining a gradient of a loss function that penalizes the semantic segmentation neural network for generating, for points in the component, non-zero scores for categories that are not the ground truth category for any labeled point in the component; and updating, using the gradient, the parameters of the semantic segmentation neural network.

20 Claims, 5 Drawing Sheets

(56) References Cited

U.S. PATENT DOCUMENTS

| | | | |
|---|---|---|---|
| 2021/0158511 A1* | 5/2021 | Guo | G06T 3/18 |
| 2022/0067943 A1* | 3/2022 | Claessen | G06V 10/764 |
| 2022/0156585 A1* | 5/2022 | Leng | G06N 3/082 |
| 2022/0188578 A1* | 6/2022 | Hu | G06F 18/24323 |
| 2022/0237416 A1* | 7/2022 | Araki | G06F 18/217 |
| 2022/0300681 A1* | 9/2022 | Ren | G06V 10/23 |
| 2023/0082899 A1* | 3/2023 | Corral-Soto | G06N 3/044 |
| | | | 706/21 |
| 2023/0115887 A1* | 4/2023 | Tan | G06V 20/70 |
| | | | 345/633 |
| 2023/0168100 A1* | 6/2023 | Widjaja | G08G 1/096791 |
| 2023/0196728 A1* | 6/2023 | Flores Tapia | G06F 18/2321 |
| | | | 382/103 |
| 2023/0252638 A1* | 8/2023 | Hotson | G06V 10/7747 |
| | | | 382/157 |
| 2023/0267615 A1* | 8/2023 | Agia | G01S 17/42 |
| | | | 345/419 |
| 2023/0368032 A1* | 11/2023 | Eckart | G06N 3/09 |
| 2024/0078787 A1* | 3/2024 | Taghavi | G06V 10/762 |

OTHER PUBLICATIONS

He et al., "Mask r-cnn," Proceedings of the IEEE International Conference on Computer Vision, 2017, pp. 2961-2969.

Liu et al., "One Thing One Click: A Self-Training Approach for Weakly Supervised 3D Semantic Segmentation," Proceedings of the IEEE/CVF Conference on Computer Vision and Pattern Recognition, 2021, pp. 1726-1736.

Ronneberger et al., "U-net: Convolutional networks for biomedical image segmentation," International Conference on Medical Image Computing and Computer-Assisted Intervention, 2015, pp. 234-241.

Shi et al., "Label-Efficient Point Cloud Semantic Segmentation: An Active Learning Approach," CoRR, Apr. 12, 2021, arXiv:2101.06931v2, 16 pages.

Trevor et al., "Efficient Organized Point Cloud Segmentation with Connected Components," Georgia Institute of Technology's center for Robotics & Intelligent Machines, 6 pages.

Tung et al., "Similarity-preserving knowledge distillation," Proceedings of the IEEEICVF International Conference on Computer Vision, 2019, pp. 1365-1374.

Xie et al., "Linking Points With Labels in 3D," IEEE Geoscience and Remote Sensing Magazine, Jun. 3, 2020, 25 pages.

Yang et al., "Plane detection in point cloud data," Proceedings of the 2nd Int. Conj. on machine control guidance, Jan. 25, 2010, 1:95-104.

Zhu et al., "Cylindrical and asymmetrical 3D convolution networks for lidar segmentation," Proceedings of the IEEE/CVF Conference on Computer Vision and Pattern Recognition, 2021, pp. 9939-9948.

* cited by examiner

SEMANTIC SEGMENTATION NEURAL NETWORK FOR POINT CLOUDS

CROSS-REFERENCE TO RELATED APPLICATION

This application claims priority to U.S. Provisional Application No. 63/245,713, filed on Sep. 17, 2021. This disclosure of the prior application is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within images. For example, a neural network can be used to determine that an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes how a computer system can train a semantic segmentation neural network to generate a semantic segmentation for a point cloud input. The semantic segmentation neural network has a plurality of parameters and is configured to process the point cloud in accordance with the parameters to generate the semantic segmentation. The semantic segmentation includes, for each of a plurality of points in the point cloud, a respective score for each of a plurality of categories that represents a likelihood that the point is a measurement of an object that belongs to the category.

An autonomous or semi-autonomous vehicle system can include lidar systems that detect reflections of laser light using one or more lidar sensors and generate one or more point clouds characterizing the scene. Performing semantic segmentation from the one or more point clouds can provide fine-grained understanding of the scene and of objects of arbitrary shape, improving the operation of the autonomous vehicle.

Generally, fully supervised training of a semantic segmentation neural network model requires annotating all the points in a point cloud. However, a point cloud can include a large number of points, e.g., millions of points per second per lidar sensor, and fully annotating all points can be extremely difficult. For example, requiring human annotators to manually annotate all of the points in a large set of point clouds may be infeasible or overly time intensive.

In general, one innovative aspect of the subject matter described in this specification can be embodied in methods that include the actions of obtaining a batch of one or more training point clouds that each includes a respective plurality of training points, wherein, for each training point cloud, the respective plurality of points are divided into a respective plurality of components; obtaining, for each training point cloud and for each of the respective plurality of components for the training point cloud, data identifying one or more labeled points in the component and, for each labeled point, a ground truth category for the labeled point; for each training point cloud: processing the training point cloud using the semantic segmentation neural network and in accordance with current values of parameters to generate a semantic segmentation that includes, for each of the respective plurality of points in the training point cloud, a respective score for each of the plurality of categories; determining a gradient of a loss function that includes a first term that, for each training point cloud and for each of the respective plurality of components for the training point cloud, penalizes the semantic segmentation neural network for generating, for points in the component, non-zero scores for categories that are not the ground truth category for any labeled point in the component; and updating, using the gradient, the current values of the parameters of the semantic segmentation neural network. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The loss function includes a second term that measures, for each training point cloud and for each labeled point in each of the plurality of components for the training point cloud that is one of the points in the training point cloud, an error between (i) the respective scores for each of the plurality of categories for the labeled point and (ii) the ground truth category for the labeled point. The actions further include identifying, as a pure component, any component in any of the training point clouds for which all of the labeled points in the component have a same ground truth category, wherein: the loss function includes a third term that measures, for each point in the training point cloud that is in a pure component, an error between (i) the respective scores for each of the plurality of categories for the point and (ii) the ground truth category for the one or more labeled points in the pure component to which the point belongs. The loss function includes a fourth term that measures, for each training point cloud, a prototype feature learning loss on prototype features for each of the plurality of categories that, for each particular category, are generated from an intermediate output of the semantic segmentation neural network for (i) labeled points that are in the training point cloud and that have the particular category as the ground truth category and (ii) points in the training point cloud that are in a component for which all of the labeled points in the component have the particular category as the ground truth category. The actions further include for each training point cloud, processing a fused point cloud generated from the training point cloud and one or more additional point clouds captured within a time window of the training point cloud using a trained multi-frame semantic segmentation neural network that has been trained to process the fused point cloud to generate a fused semantic segmentation that includes, for each of the plurality of points in the training point cloud, a respective fused score for each of the plurality of categories, wherein the loss function includes a fifth term that measures, for each point in each training point cloud, an error between (i) the respective scores for each of the plurality of categories for the point generated by the semantic segmentation neural network and (ii) the respective fused scores for each of the plurality of categories for the point generated by the trained multi-frame semantic segmentation neural network. The actions further include, for each training point cloud: providing, for presentation to a user on a user device, a visual representation of at least the respective plurality of points in the training point cloud that identifies the respective plurality of components for the training point cloud; and obtaining, from the user device, user inputs specifying the one or more labeled points in each of the components and, for each labeled point, the ground truth category for the labeled point. The actions further include generating the respective plurality of components for each of the one or more training point clouds, including: for each training point cloud, generating a fused point cloud from the training point cloud and one or more additional point clouds captured within a time window of the training point cloud; detecting ground points in the fused point cloud, wherein each ground point corresponds to a measurement of a ground in an environment; generating a plurality of non-ground points by removing the ground points from the fused point cloud; generating a plurality of initial components from the plurality of non-ground points; and generating the plurality of components for the training point cloud from the ground points and the plurality of initial components. Generating the plurality of initial components from the plurality of non-ground points includes: for each point, identifying, as connected points for the point, each point that is within a corresponding threshold distance of the point; and generating the plurality of initial components from the connected points, wherein each initial component includes a group of connected points. The corresponding threshold distance for each point is based on a distance from the point to a sensor that captured the training point cloud. Generating the plurality of component for the training point cloud from the ground points and the plurality of initial components includes: generating one or more fixed size components that include only the ground points. Generating the plurality of component for the training point cloud from the ground points and the plurality of initial components includes: dividing any initial component that exceeds a first fixed size into multiple components. The first term measures, for each training point cloud and for each of the respective plurality of components for the training point cloud: for each of a plurality of points in the component, a sum of respective scores for the point that are for categories that are not the ground truth category for any labeled point in the component.

Particular embodiments of the subject matter described in this specification can be implemented so as to realize one or more of the following advantages. The systems and techniques describe an efficient way to annotate point cloud data and to use the annotations to train a semantic segmentation neural network. Rather than labeling all the points in a point cloud, which is time consuming and difficult and may not be feasible, the systems and methods only need to annotate a small portion of the points in a point cloud and then train a semantic segmentation neural network using the small amount of annotations, while achieving comparable semantic segmentation performance to fully supervised models that are trained on fully annotated point cloud data.

In particular, the systems and techniques can divide the point cloud into multiple components and then only require a human labeler to annotate a small number of points, e.g., a single point, for each object category that appears in the component. By training a semantic segmentation neural network model using a combination of the annotated point labels, component-wise labels that are derived from the annotated point labels, and point labels that are derived from pure components (i.e., components with a single object category according to the human labels), the systems and techniques can make full use of the sparse annotations and the trained neural network model can generate good semantic segmentation results for challenging outdoor scenarios in which object category distribution is highly unbalanced.

In some cases, the systems and techniques can improve the quality of the annotations (e.g., for small objects and low frequency objects) by fusing multiple point clouds and obtaining point labels that are annotated based on the components identified from the fused point cloud.

In some cases, the systems and techniques can improve the performance of the semantic segmentation neural network by knowledge distillation, e.g., training the semantic segmentation neural network that processes a single point cloud (i.e., a student network) under the guidance of a trained semantic segmentation neural network that processes a fused point cloud (i.e., a trained teacher network).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a fully-learned neural network to generate a semantic segmentation from an input point cloud. The semantic segmentation includes, for each of a plurality of points in the input point cloud, a respective score for each of a plurality of categories that represents a likelihood that the point is a measurement of an object that belongs to the category. As used in this description, a "fully-learned" machine learning model is a model that is trained to compute a desired prediction. In other words, a fully-learned model generates an output based solely on training data rather than on human-programmed decision logic.

Figure 1:
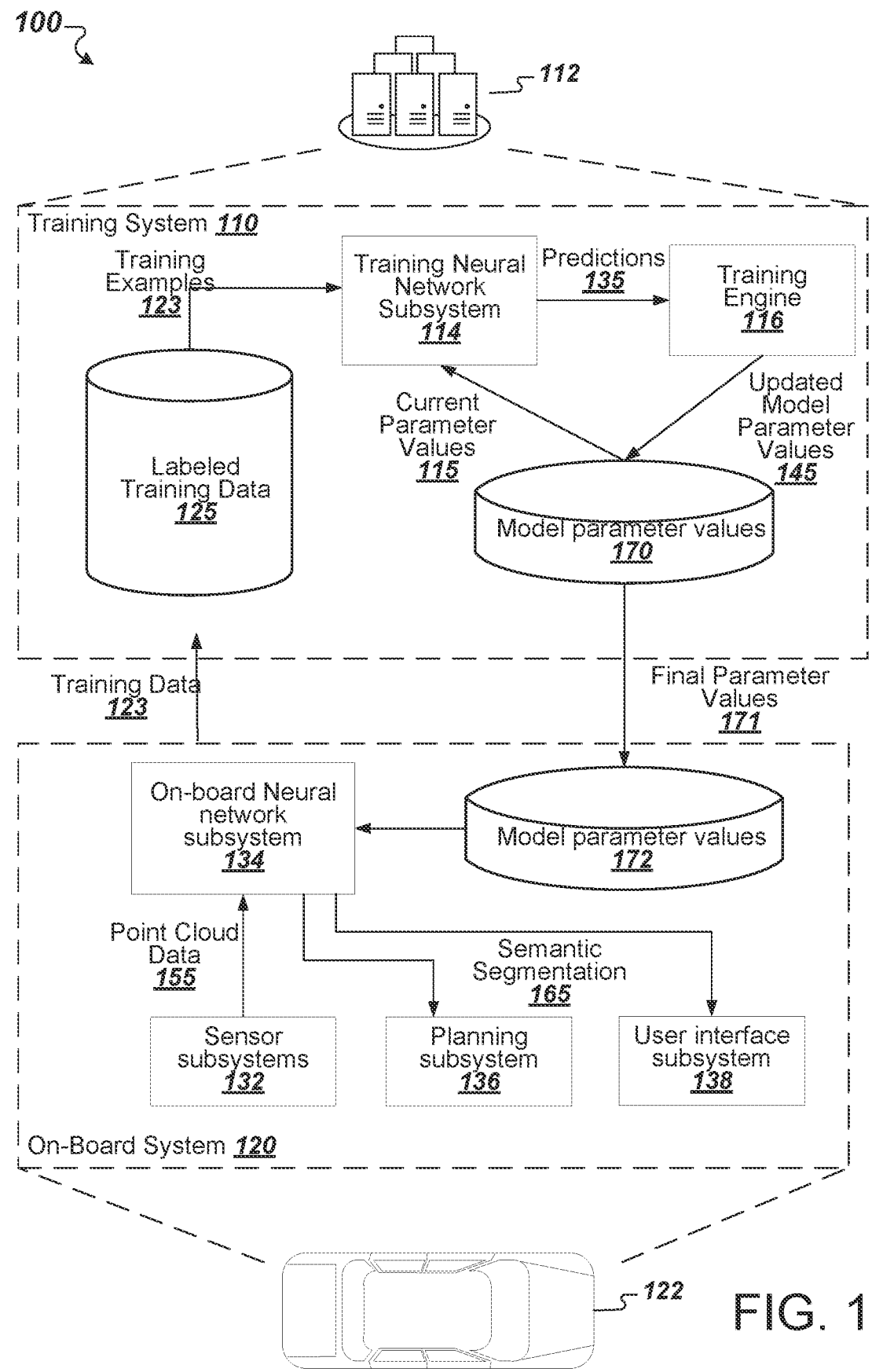
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses predictions from an on-board neural network subsystem 134 to inform fully-autonomous driving decisions. The vehicle 122 can also be a semi-autonomous vehicle that uses the predictions from the on-board neural network subsystem 134 to aid a human driver. For example, the vehicle 122 can autonomously apply the brakes if a prediction from the on-board neural network subsystem 134 indicates that a pedestrian is approaching near the vehicle 122.

The on-board system 120 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light. The sensor subsystems 132 provide input sensor data to an on-board neural network subsystem 134. The input sensor data can be derived from data generated by one or more sensors that characterizes a scene in the vicinity of the autonomous vehicle.

The sensor subsystem 132 can provide point cloud data 155 generated by one or more lidar sensors of the lidar systems to the on-board neural network subsystem 134. A point cloud is a collection of three-dimensional points that measure three-dimensional information of the environment. Each point in the point cloud can represent a distance from the lidar sensor to an object's external surface. Each point in the point cloud can be associated with additional information of the lidar sensor, e.g., intensity, second return, elongation, and so on, and the additional information can also be processed as input to the on-board neural network subsystem. The point cloud data 155 can characterize a scene of an environment that is near the vehicle 122. For example, the point cloud data 155 can include a point cloud of an outdoor environment.

The point cloud data 155 can include one or more point clouds that are each captured at a respective time point, and each point cloud can include a plurality of points characterizing objects in the scene. Each point cloud can be non-uniformly distributed in the three-dimensional (3D) space, having denser points near the lidar sensor and sparser points away from the lidar sensor. Therefore, it is challenging to generate accurate semantic segmentation for objects in a single point cloud that depicts an outdoor environment.

Some objects in the environment can be well-represented in training point clouds that are used to train a semantic segmentation neural network because they are large objects or appear more frequently in the environment. Examples of well-represented object categories can include car, road, building, vegetation, terrain, and so on. Some objects in the environment can be underrepresented in the training point clouds because the objects are small objects or appear less frequently in the environment. For example, bicycle, motorcycle, person, and bicyclist can belong to categories that are underrepresented in a point cloud. Furthermore, the under-represented categories are more likely being occluded by or overlapped with other objects. Therefore, it is challenging to generate accurate semantic segmentation for objects that belong to the under-represented categories.

The on-board neural network subsystem 134 implements the operations of each layer of a semantic segmentation neural network trained to make semantic segmentation predictions. Thus, the on-board neural network subsystem 134 includes one or more computing devices having software or hardware modules that implement the respective operations of each layer of the neural network according to an architecture of the neural network.

The semantic segmentation neural network can include any neural network model that is configured to generate semantic segmentations. For example, the semantic segmentation neural network can have a U-net architecture (Ronneberger, Olaf, Philipp Fischer, and Thomas Brox. "U-net: Convolutional networks for biomedical image segmentation." *International Conference on Medical image computing and computer-assisted intervention*. Springer, Cham, 2015). As another example, the semantic segmentation neural network can have a mask R-CNN architecture (He, Kaiming, et al. "Mask r-cnn." *Proceedings of the IEEE international conference on computer vision*. 2017). In some examples, the semantic segmentation neural network can include a cylindrical 3D convolutional neural network for processing 3D point cloud (Zhu, Xinge, et al. "Cylindrical and asymmetrical 3d convolution networks for lidar segmentation." Proceedings of the IEEE/CVF conference on computer vision and pattern recognition. 2021).

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 uses the point cloud data 155 that includes a plurality of points depicting an environment near the vehicle 122 to generate a semantic segmentation 165. For example, the on-board neural network subsystem 134 can receive as input a point cloud including a plurality of points and can process the point cloud using the semantic segmentation neural network to generate a semantic segmentation. The on-board neural network subsystem 134 can provide the semantic segmentation 165 to a planning subsystem 136, a user interface subsystem 138, or both.

The semantic segmentation 165 includes, for each of a plurality of points of a point cloud input, a respective score for each of a plurality of categories. Each respective score represents a likelihood that the point is a measurement of an object that belongs to the category. The plurality of categories can include any appropriate objects in an environment near the autonomous vehicle. For example, the plurality of categories can include tree, vehicle, pedestrian, traffic sign, road, and bicycle, which correspond to objects in an outdoor environment.

As a simplified example, an input point cloud can include hundreds of points in a three-dimensional space and the plurality of categories can include three categories, e.g., bicycle, traffic sign, and road. The semantic segmentation can include three scores for each point in the point cloud. Each score can indicate a likelihood that the point is a measurement of an object that belongs to the respective category. For example, the semantic segmentation can include {0.3, 0.1, and 0.6} for a point in the point cloud, indicating a 30% likelihood that the point corresponds to a bicycle, a 10% likelihood that the point corresponds to a traffic sign, and a 60% likelihood that the point corresponds to a road.

When a planning subsystem 136 receives the semantic segmentation 165, the planning subsystem 136 can use the semantic segmentation 165 to make fully-autonomous or semi-autonomous driving decisions. For example, based on a semantic segmentation prediction of a bicycle, the planning subsystem 136 can predict the size of the bicycle and the trajectory of the bicycle that is traveling on the sideway, and can generate a fully-autonomous plan to navigate around the bicycle.

A user interface subsystem 138 can receive the semantic segmentation 165 and can generate a user interface presentation that indicates the semantic segmentation of nearby objects, e.g., showing 3D masks or contours of the detected objects. For example, the user interface subsystem 138 can generate a user interface presentation having image or video data containing a mask representation of the regions of space that are likely to be occupied by a nearby vehicle. An on-board display device can then display the user interface presentation for passengers of the vehicle 122.

The on-board neural network subsystem 134 can also use the input sensor data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make semantic segmentation predictions from point cloud data. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training system 110 can generate labeled training data 125 by obtaining labels for the training data 123.

The training data 123 includes a set of one or more training point clouds that each include a respective plurality of training points. The training system 110 can obtain, for each training point cloud, data identifying one or more labeled points in the point cloud and a ground truth category for each labeled point. For example, a human labeler can identify one or more labeled points in the point cloud and provide annotations identifying the ground truth categories for each labeled point.

For example, the training data 123 can include one training point cloud that includes 500 points. A human labeler can identify three objects, e.g., a bicycle, a traffic sign, and a road, depicted by the training point cloud. The human labeler can identify a first labeled point among the points that depict the bicycle and annotate its ground truth category as "bicycle", a second labeled point among the points the depict the traffic sign and annotate its ground truth category as "traffic sign", and a third labeled point among the points that depict the road and annotate its ground truth category as "road". Therefore, although the point cloud includes 500 points, only 3 points are identified and annotated by the human labeler as the labeled points.

In some implementations, for example, in an outdoor environment, the distribution of the plurality of categories can be unbalanced. For example, the ratio of the number of points in a point cloud for vegetation, car, and bicycle categories can be 1600:250:1. A bicycle instance may correspond to ten points in a particular point cloud. Therefore, in order to obtain accurate labels/annotations for training a semantic segmentation neural network, it can be beneficial to fuse point clouds from multiple point clouds captured at different time points and generate a fused point cloud. Then the fused point cloud can be labeled or annotated. The objects that belong to the underrepresented object categories can correspond to more points in the fused point cloud, e.g., from multiple view angles and over a period of time. Therefore, a human labeler is more likely to correctly annotate one or more points that correspond to the underrepresented object. At inference time, the on-board system 120 can be required to generate real time semantic segmentation 165. Therefore, the on-board system 120 usually processes a single point cloud to generate a semantic segmentation instead of processing a fused point cloud that is generated from multiple point clouds over a period of time.

The training neural network subsystem 114 can receive training examples 123 as input. The training examples 123 can include labeled training data 125. Each of the training examples 123 includes a training point cloud as well as one or more labeled points that indicate the ground truth categories of one or more objects represented by the training point cloud. In some implementations, the training example 123 can also include derived labels for other points in the point cloud, and the derived labels can be generated from the one or labeled points.

The training neural network subsystem 114 can generate, for each training example 123, a semantic segmentation prediction 135 using a semantic segmentation neural network that is being trained by the training neural network subsystem 114. The semantic segmentation prediction 135 includes, for each of the respective plurality of points in the training point cloud, a respective score for each of the plurality of categories. For example, assuming there exists a total of six categories: "road", "car", "pedestrian", "vegetation", "traffic sign", and "bicycle", the semantic segmentation prediction can generate six scores for each point in the training point cloud. Each score can indicate a likelihood that the point belongs to the respective category.

A training engine 116 analyzes the semantic segmentation prediction 135 and compares the semantic segmentation prediction to the labeled points and/or other derived labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
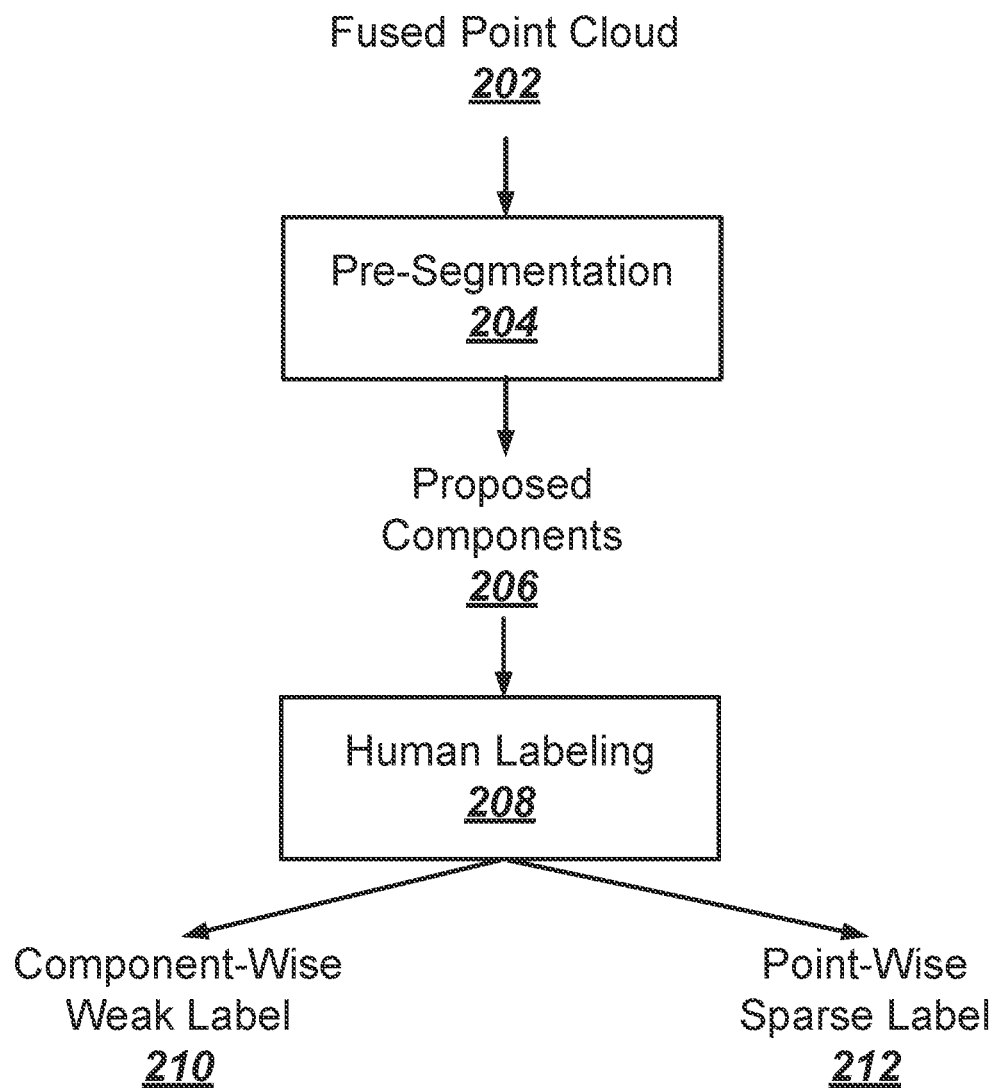
FIG. 2 illustrates an example of generating labels for training a semantic segmentation neural network for point clouds.

FIG. 2 illustrates an example of generating labels for training a semantic segmentation neural network for point clouds. The example illustrates a technique that jointly optimizes the annotation of training data and the training of a semantic segmentation neural network for point cloud semantic segmentation. The process will be described as being performed by an appropriately programmed training system, e.g., the training system 110 of FIG. 1.

The system fuses multiple point clouds together to generate a fused point cloud 202. The fused point cloud 202 can be generated from a training point cloud and one or more additional point clouds captured within a specified time window of the training point cloud. The fused point cloud 202 includes additional points of the objects in a scene captured by the one or more additional point clouds, including points that depict the object from multiple angles. Generating and using a fused point cloud can be optional. In some implementations, the system can operate the example training process of FIG. 2 on a single training point cloud instead of the fused point cloud.

Figure 3:
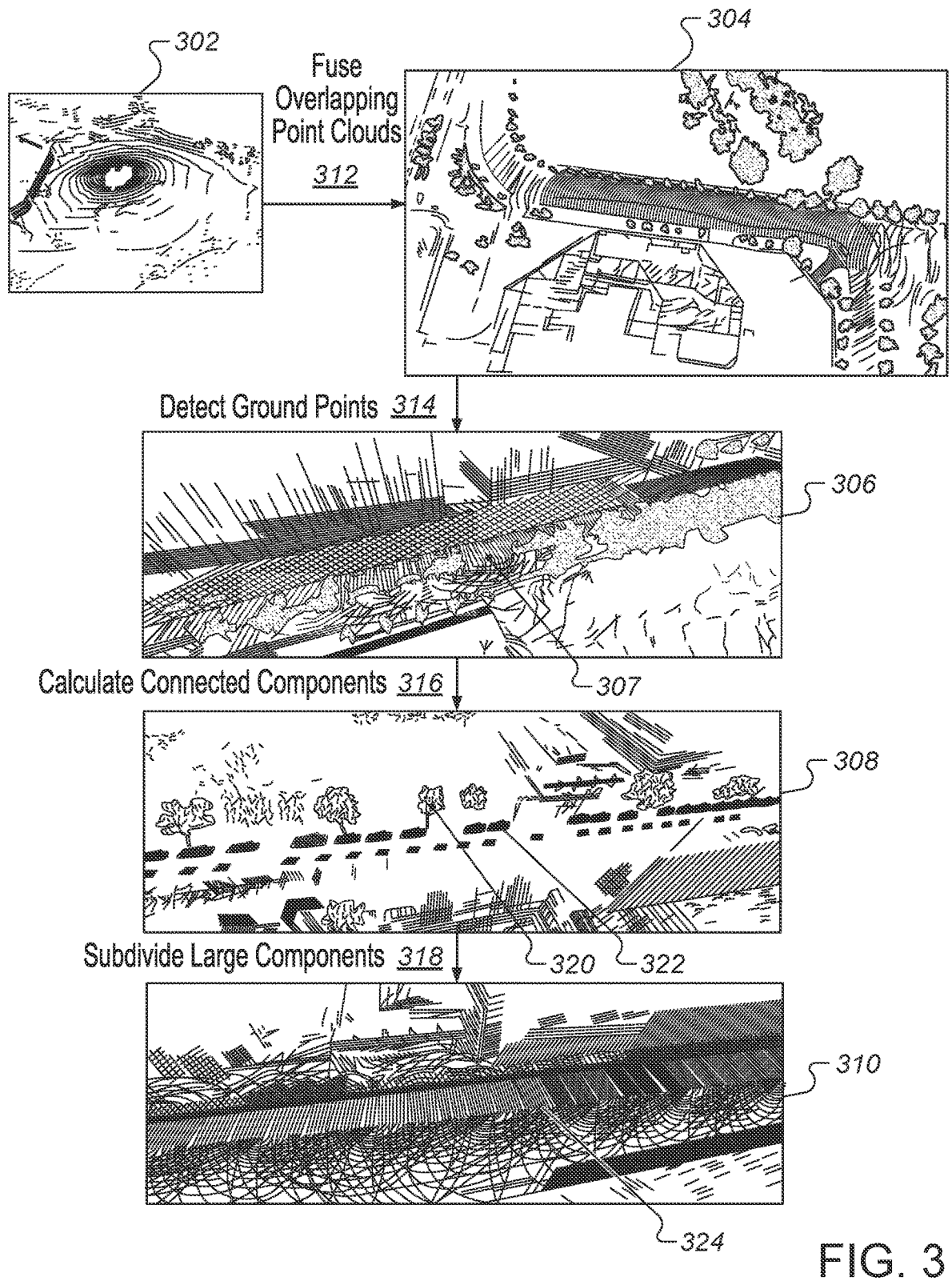
FIG. 3 illustrates an example of pre-segmentation for point clouds.

For example, FIG. 3 illustrates an example of fusing point clouds. The training system receives a training point cloud 302 captured by a lidar sensor at a first time point. Some of the objects characterized by the training point cloud 302 can be underrepresented because there are not enough points for these objects, especially for the objects that are either small or far away from the lidar sensor. The system can identify multiple point clouds that overlap with the training point cloud and are captured within a time window of the first time point. For example, the system can obtain five point clouds captured at five time point with an interval of 5 milliseconds, e.g., {t−10, t−5, t, t+5, t+10}, in which the training point cloud 302 is captured at time t. In some implementations, the system can downsample the points in the one or more point clouds to reduce the number of points that need to be processed.

The multiple point clouds can be captured by the same lidar sensor that captures the training point cloud, or can be captured by multiple lidar sensors. The system can generate a fused point cloud 304 by fusing the multiple point clouds (312). For example, the system can project the points in each of the additional point clouds to a reference frame of the training point cloud. The system can then generate the fused point cloud by combining the points in the training point cloud and the projected points of the additional point clouds. The fused point cloud 304 includes points that depict objects from multiple angles over a period of time. Therefore, the objects in the fused point cloud 304 can be better represented.

Referring back to FIG. 2, the system performs a pre-segmentation processing 204 on the fused point cloud 202 to generate a plurality of proposed components 206. The pre-segmentation process 204 can propose a plurality of components 206 by clustering, such that later on, annotations can be made on the components 206 instead of labeling each point in the fused point cloud 202.

FIG. 3 illustrates an example of pre-segmentation for point clouds. The training system can detect (314) ground points in the fused point cloud 304. Each ground point corresponds to a measurement of a ground in an environment. The image 306 illustrates detected ground points. For example, the point 307 is a ground point detected by the training system. The system can use any appropriate algorithms that can properly detect the ground points. In some implementations, based on the assumption that the ground points for a local region can be fitted by a plane, the system can detect ground points through a plane detection algorithm, such as the Random Sample Consensus (RANSAC) algorithm (Yang, Michael Ying, and Wolfgang Förstner. "Plane detection in point cloud data." *Proceedings of the 2nd int conf on machine control guidance, Bonn.* Vol. 1. 2010).

The system can generate a plurality of non-ground points by removing the ground points from the fused point cloud. The plurality of non-ground points corresponds to non-ground objects, such as vegetation, cars, road signs, buildings, and so on. As shown in image 308, after removing the ground points, the non-ground points can be relatively well separated among different objects.

The system can generate a plurality of initial components from the plurality of non-ground points. In some implementations, the system can calculate (316) a plurality of connected components of the non-ground points.

To generate the initial components, the system can perform connected-component labeling (e.g., Dillencourt, Michael B., Hanan Samet, and Markku Tamminen. "A general approach to connected-component labeling for arbitrary image representations." *Journal of the ACM (JACM)* 39.2 (1992): 253-280), which is a type of algorithm in computer vision to detect connected regions in digital images. Each connected component includes a plurality of connected points, and each point of the plurality of connected points is within a corresponding threshold distance of one or more other points in the plurality of connected points.

For example, the image 308 shows a plurality of initial components generated from the non-ground points. The initial components include components for cars (e.g., a component 322 for a car), components for trees (e.g., a component 320 for a tree), and so on.

In some implementations, the corresponding threshold distance for each point can be based on a distance from the point to the lidar sensor that captured the training point cloud to account for the fact that points that are farther away from the sensor tend to be sparser than points that are closer to the sensor. That is, the system can use an adaptive distance threshold to compensate for the non-uniform distribution of the point cloud. For example, the adaptive distance threshold T for a given point can be a function of the distance D from the given point to the lidar sensor, e.g., T=a*D, where a is a constant value, e.g., 0.1, 0.2, or 0.3.

The system can generate a plurality of proposed components for the fused point cloud 304 from the ground points (e.g., the points shown in the image 306) and the plurality of initial components (e.g., the components shown in the image 308). The system can generate a plurality of ground components from the ground points by performing connected-component labeling. The system can generate the proposed components that includes the plurality of ground components and the plurality of initial (non-ground) components.

In some implementations, the system can divide large components into components with smaller sizes (318). In some implementations, the system can generate one or more fixed size components that include only the ground points. For example, the system can divide the ground points into tiles and each tile can have a predetermined size of N meters by M meters, where N and M are constant values. For example, each tile can have a size of 5 meters by 5 meters. As shown in the image 310, the points in the tile 324 belong to a component. In some implementations, the system can divide any initial component that exceeds a first fixed size into multiple components. For example, for large components (e.g., buildings and vegetation), the system can divide an initial component into multiple smaller components with a fixed size.

Dividing large components can help make smaller objects more noticeable by a labeler during the annotation process. For example, an initial component can include points that depict a building and points that depict a bicycle leaning against the wall of the building. The points for the bicycle occupy a smaller portion of the points in the initial component. The system can divide the initial component into a plurality of smaller components with a predetermined size of N meters by M meters, e.g., 5 meters by 5 meters. For each smaller component that includes one or more points that correspond to the bicycle, the points for the bicycle occupy a larger portion of the points in the smaller component. Therefore, the bicycle is more noticeable in the smaller component.

Dividing large components into smaller components can also generate a large number of "pure" components (i.e., components with a single object category according to the human labels) because it is more likely that a smaller component corresponds to a single object category according to the human labels. The system can generate per point labels for the pure components, e.g., setting the labels for all the points in a component the same as the sparse point label annotated by a human labeler. The point labels derived for the pure components can provide more accurate supervision for training the semantic segmentation neural network.

The example pre-segmentation process illustrated in FIG. 3 can generate a plurality of proposed components. Because of the way that the components are generated, most of the proposed components are pure, i.e., components that include only points belonging to one object category. A small number of the proposed components may correspond to two or more objects. Considering the number of points in the fused point cloud, the pre-segmentation process can generate a relatively small number of proposed components to cover most of the points in the fused point cloud.

FIG. 3 shows one possible example process to perform pre-segmentation to generate a plurality of proposed components. The specification is not limited to this example implementation. Other implementations of pre-segmentation can be applied here as well, such as a pre-segmentation process that uses a machine learning algorithm.

Referring back to FIG. 2, the system obtains annotations for the plurality of proposed components. For example, the system can obtain the annotations through human labeling 208. Because each component corresponds to one or a few object categories, for each proposed component, a human labeler can annotate only a single point for each category that appears in the component, instead of annotating every point in the fused point cloud 202.

Figure 4:
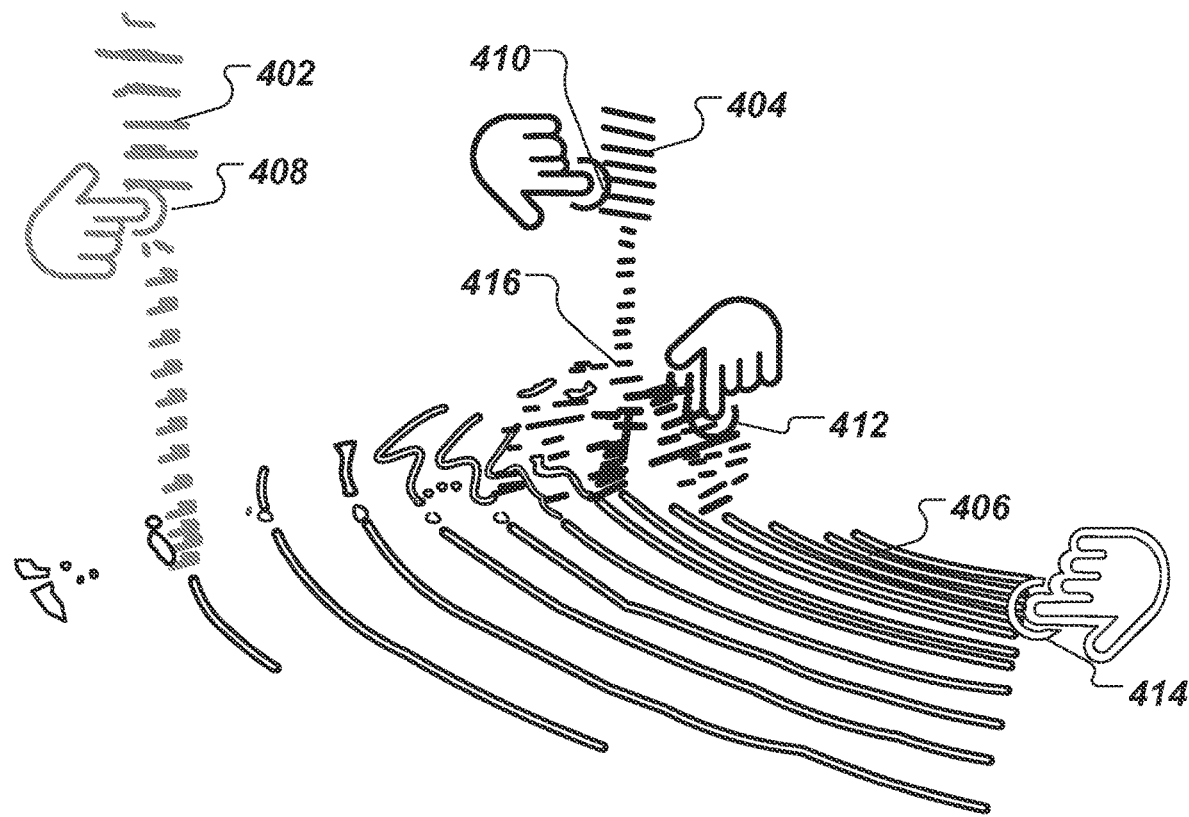
FIG. 4 illustrates an example of annotating components in a point cloud.

FIG. 4 illustrates an example of annotating components in a point cloud. After pre-segmentation, the point cloud includes three components: 402, 404, and 406. The component 402 includes connected points for a first traffic sign. The component 404 corresponds to two objects and includes (i) points for a second traffic sign; and (ii) points for a bicycle. Because the bicycle leans against the second traffic sign, the points for the bicycle are connected with the points for the second traffic sign. The component 406 includes connected points for a road.

For each component, a human labeler can annotate respective ground truth categories for one or more points in the component. The labeler is not required to label any other points in the point cloud. Therefore, even though the labeler labels only a tiny fraction of the points, the system can still accurately label the entire point cloud. For example, for component 402, a labeler can select a point 408 in the component and can label the point 408 with the category "traffic sign". For component 404, the labeler can select two points 410 and 412. The labeler can select the point 410 that corresponds to the second traffic sign and can label the point 410 with the category "traffic sign". The labeler can select the point 412 that corresponds to the bicycle and can label the point 412 with the category "bicycle". For component 406, the labeler can select a point 414 in the component and can label the point 414 with the category "road".

Referring back to FIG. 2, the system obtains a plurality of annotated labels for the fused point cloud 202. The system can use the labeled training point cloud to train a semantic segmentation neural network. The annotated labels can include point-wise sparse labels 212 for the point cloud, where the point-wise sparse labels 212 are the small number of points in the fused point cloud that are identified and annotated by a human labeler. For example, in FIG. 4, only four points (i.e., 408, 410, 412, and 414) are directly annotated by a human labeler for the three components in the point cloud.

The training system can derive component-wise weak labels 210 for the point cloud. For each component, the system can determine that all the points in the component belong to the one or more ground truth categories identified by the point-wise sparse labels. That is, each point in the component cannot belong to a ground truth category that is not identified by the point-wise sparse labels. These component-wise labels are weak labels because (i) the location and shape of the component depends on the quality of the pre-segmentation, and (ii) a component may include points corresponding to several objects that belong to different ground truth categories.

For example, in FIG. 4, the system can determine that all the points in the component 402 belong to the "traffic sign" ground truth category. The system can determine that all the points in the component 404 belong to either the "traffic sign" ground truth category or the "bicycle" ground truth category, i.e., each point in the component 404 cannot belong to a category that is not "traffic sign" or "bicycle". The system can determine that all the points in the component 406 belong to the "road" ground truth category.

When all of the labeled points in the component have the same ground truth category, the component is a pure component. The system can generate derived point-wise labels for pure components. The system can determine that all the points in the component have the same ground truth category. For example, there is only one labeled point 408 for the component 402, and the system can determine that all the points in the component 402 belong to the same ground truth category as the labeled point 408. That is, all the points in the component 402 belong to the "traffic sign" ground truth category.

In some implementations, a component can have labeled points that belong to a number of ground truth categories that is larger than the threshold, e.g., the number of ground truth categories is larger than 10. That is, the component can have noisy ground truth categories. The system can discard the component that has noisy ground truth categories, and does not use the component in the training of the neural network.

Figure 5:
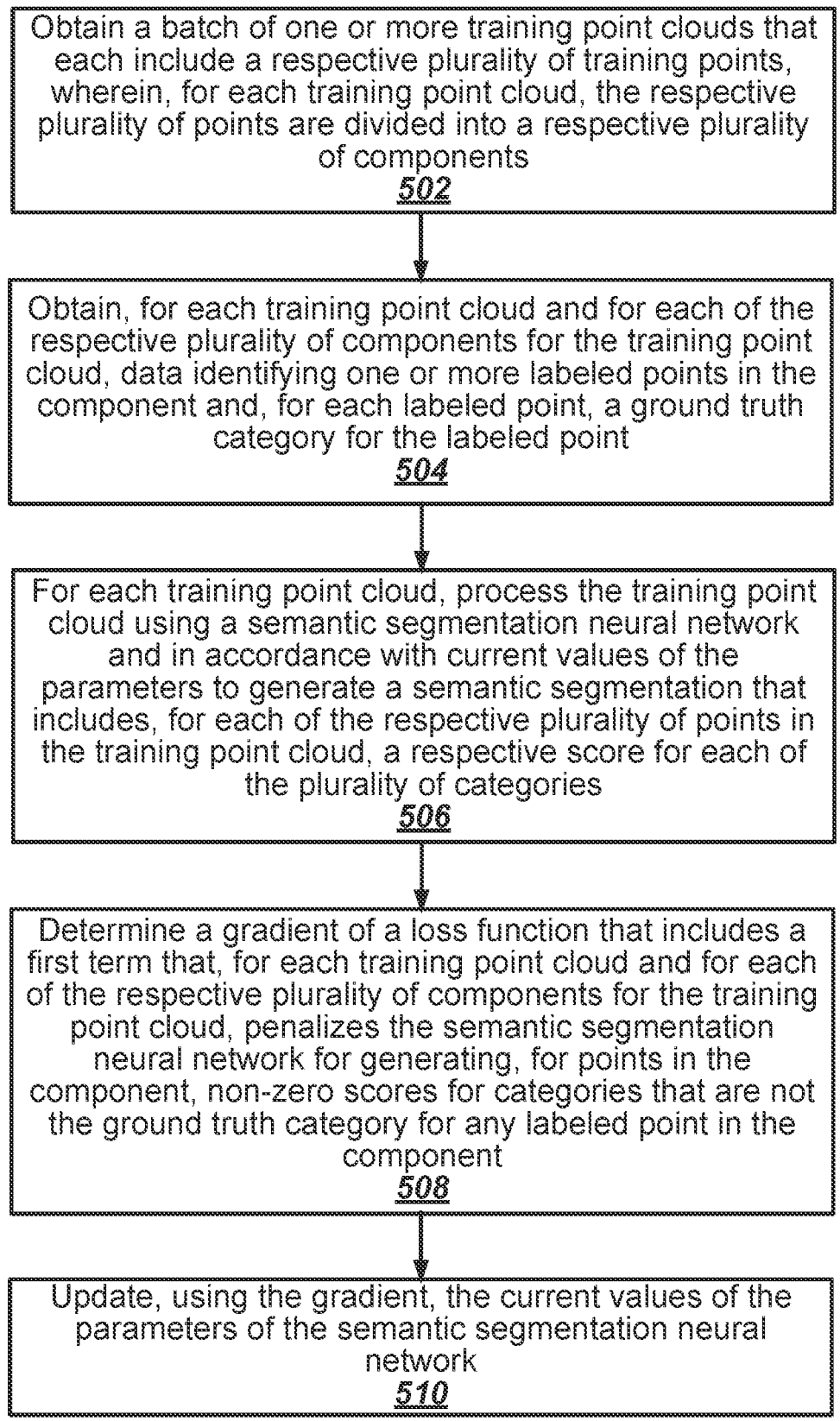
FIG. 5 is a flow chart of an example process for training a semantic segmentation neural network for point clouds.

FIG. 5 is a flow chart of an example process for training a semantic segmentation neural network for point clouds. The process will be described as being performed by an appropriately programmed training system, e.g., the training system 110 of FIG. 1.

The system obtains a batch of one or more training point clouds that each includes a respective plurality of training points (502). For each training point cloud, the respective plurality of points are divided into a respective plurality of components. For example, the system can divide a training point cloud into a plurality of components following a pre-segmentation process described in connection with FIG. 3.

The system obtains, for each training point cloud and for each of the respective plurality of components for the training point cloud, data identifying one or more labeled points in the component and, for each labeled point, a ground truth category for the labeled point (504).

In some implementations, the one or more labeled points can be points in a fused point cloud generated from the training point cloud and one or more additional point clouds captured within a time window of the training point cloud. The fused point cloud can include additional points of objects in a scene captured by the one or more additional point clouds, including points that depict the object from multiple angles. The fused point cloud can include a plurality of components. Accordingly, a user can label one or more labeled points in the respective plurality of components included in the fused point cloud. Thus, the one or more labeled points in each component can be points from the training point cloud or points from the one or more additional point clouds. For example, the labels for the labeled points can be determined based on the point-wise sparse label 212 of a fused point cloud described in connection with FIG. 2.

In some implementations, the system can provide, for presentation to a user on a user device, a visual representation of at least the respective plurality of points in the training point cloud that identifies the respective plurality of components for the training point cloud. The system can obtain, from the user device, user inputs specifying the one or more labeled points in each of the components and, for each labeled point, the ground truth category for the labeled point.

For example, referring back to FIG. 4, the system can present to a labeler on a computer, a visual representation of the points that identifies the components 402, 404, and 406 in the training point cloud. The labeler can specify a labeled point 408 for the component 402, two labeled points 410 and 412 for the component 404, and a labeled point 414 for the component 406. The labeler can specify that the ground truth category for the labeled point 408 is "traffic sign". The labeler can specify that the ground truth category for the labeled point 410 is "traffic sign". The labeler can specify that the ground truth category for the labeled point 412 is "bicycle". The labeler can specify that the ground truth category for the labeled point 414 is "road".

Referring back to FIG. 5, for each training point cloud, the system processes the training point cloud using the semantic segmentation neural network and in accordance with current values of the parameters to generate a semantic segmentation that includes, for each of the respective plurality of points in the training point cloud, a respective score for each of the plurality of categories (506).

The semantic segmentation neural network has a plurality of parameters and the semantic segmentation neural network is configured to receive as input a point cloud including a plurality of points and to process the point cloud in accordance with the parameters to generate a semantic segmentation. The semantic segmentation includes, for each of the plurality of points, a respective score for each of a plurality of categories that represents a likelihood that the point is a measurement of an object that belongs to the category.

For example, a semantic segmentation for a point can be {traffic sign: 0.4, bicycle: 0.5, road: 0.1}, indicating that the respective predicted likelihood that the point is a measurement of an object of the respective category.

The system determines a gradient of a loss function that compares the semantic segmentation generated by the semantic segmentation neural network and one or more types of labels (e.g., component-wise weak label or point-wise sparse label) for the training point clouds. The loss function includes one or more of a first term, a second term, a third term, a fourth term, and a fifth term. For example, the loss function can be a weighted sum of two or more of the first term, the second term, the third term, the fourth term, and the fifth term. Details of the first term, the second term, the third term, the fourth term, and the fifth term are described below.

The system determines a gradient of a loss function that includes a first term that, for each training point cloud and for each of the respective plurality of components for the training point cloud, penalizes the semantic segmentation neural network for generating, for points in the component, non-zero scores for categories that are not the ground truth category for any labeled point in the component (508). That is, the first term can compare the semantic segmentation with the component-wise weak labels. In some implementations, the first term can measure, for each training point cloud and for each of the respective plurality of components for the training point cloud and for each of a plurality of points in the component, a sum of respective scores for the point that are for categories that are not the ground truth category for any labeled point in the component. For example, the first term in the loss function can include the following loss $l_i$ for point i:

$$l_i = \log(1 - \Sigma_{j, y_{i,j}=0} x_{i,j}). \quad (1)$$

Here, i is the index for point i, and $y_{i,j}$ is a binary label, indicating whether point i can belong to category j. The $x_{i,j}$ is the normalized score (e.g., by Softmax) for point i and for category j generated by the neural network.

For example, referring to FIG. 4, the component 404 has two labeled points: point 410 with a ground truth category "traffic sign" and point 412 with a ground truth category "bicycle". Therefore, the system can derive component-wise labels indicating that all the points in the component 404 cannot belong to any categories that are not the "traffic sign" or the "bicycle" category. Suppose for point 416, the system generates the following prediction: {"traffic sign: 0.4", "bicycle: 0.5", "road: 0.1"}. The system can calculate the first term that penalizes the "road: 0.1" score because the point 416 should only belong to either "traffic sign" category or "bicycle" category. Based on the semantic segmentation prediction {"traffic sign: 0.4", "bicycle: 0.5", "road: 0.1"} for point 416, the system can calculate the following loss for point 416: $l_i = \log(1-0.1)$, where $x_{i,j}=0.1$ is the normalized score for category "road" that the point 416 should not belong to.

In some implementations, the training system can use appropriate training techniques to encourage semantic segmentation predictions for positive labels. For example, the system can use max-pooling to aggregate the semantic segmentation prediction over the points in each component. Some of the labeled points may be not true for a single point cloud when the labeled points are annotated from a fused point cloud of multiple point clouds. Max-pooling can be an effective way for feature extraction from a set of unordered and variable number of points. With max-pooling, the neural network model can be trained to learn strong and useful features, improving the robustness of the neural network model.

In some implementations, the loss function can include a second term that measures an error based on the point-wise sparse label. The second term can measure, for each training point cloud and for each labeled point in each of the plurality of components for the training point cloud that is one of the points in the training point cloud, an error between (i) the respective scores for each of the plurality of categories for the labeled point and (ii) the ground truth category for the labeled point. The second term can include a classification loss that measures, for each labeled point, the difference between the respective scores for the plurality of categories and a ground truth label for the labeled point. For example, the classification loss can be a cross-entropy loss. For example, the second term in the loss function can include the following loss $l_i$ for a labeled point i:

$$l_i = \Sigma_j y_{i,j} \log(x_{i,j}). \quad (2)$$

In some implementations, because there are only a few labeled points in each component, which is much less than the number of derived labels for all the other points in the component, the system can assign a higher weight to the second term such that the value of the loss function is not dominated by the first term calculated based on the derived point labels, i.e., the component-wise weak labels.

As described earlier, the one or more labeled points can be points identified in a fused point cloud. Therefore, the labeled points in each component of a fused point cloud may belong to the training point cloud, or may belong to one or more additional point clouds captured within a time window of the training point cloud. The second term can measure an error for each labeled point that is one of the points in the training point cloud, and does not measure an error for each labeled point that is not one of the points in the training point cloud, i.e., the labeled point that belongs to one or more additional point clouds.

In some implementations, the system can identify, as a pure component, any component in any of the training point clouds for which all of the labeled points in the component have the same ground truth category. For example, the component 402 is a pure component that only corresponds to a single ground truth category "traffic sign". The loss function can include a third term that measures, for each point in the training point cloud that is in a pure component, an error between (i) the respective scores for each of the plurality of categories for the point and (ii) the ground truth category for the one or more labeled points in the pure component to which the point belongs.

For example, the system can generate derived point-wise labels for the points of a pure component based on the ground truth category in the labeled points in the pure component. The derived point-wise labels are dense, e.g., can cover 30%-60% of the points in the pure component. The quality of the derived point-wise labels depends on the quality of the pre-segmentation and can provide accurate supervision when the pre-segmentation has good quality. Similar to the second term, the third term measures an error for each point in the training point cloud that is in a pure component, and does not measure an error for other points in the pure component that are not in the training point cloud. For example, the third term in the loss function can include the following loss $l_i$ for a point i:

$$l_i = \Sigma_j y_{i,j} \log(x_{i,j}). \quad (3)$$

In some implementations, the training system can perform prototype learning to learn prototype features for each of the plurality of categories. An example of prototype learning is described in Liu, Zhengzhe, Xiaojuan Qi, and Chi-Wing Fu. "One Thing One Click: A Self-Training Approach for Weakly Supervised 3D Semantic Segmentation." *Proceedings of the IEEE/CVF Conference on Computer Vision and Pattern Recognition.* 2021.

During training, the loss function can include a fourth term that measures, for each training point cloud, a prototype feature learning loss on prototype features for each of the plurality of categories. For each particular category, the prototype features for each of the plurality of categories are generated from an intermediate output of the semantic segmentation neural network for (i) labeled points that are in the training point cloud and that have the particular category as the ground truth category and (ii) points in the training point cloud that are in a component for which all of the labeled points in the component have the particular category as the ground truth category. The prototype features can be an intermediate output at an intermediate layer of the semantic segmentation neural network, e.g., an output from a pooling layer that is before the last category-wise prediction layer of a U-Net. The prototype learning technique can help minimize intra-class feature variation and can help maximize inter-class feature variation. In some implementations, the prototype feature learning can use an exponent moving average algorithm.

For example, the fourth term in the loss function can include the following loss:

$$l = \frac{1}{N}\Sigma_r^N - \log \frac{\exp(f_r k_{\bar{c}}/\tau)}{\Sigma_c \exp(f_r k_c/\tau)}. \tag{4}$$

Here, $f_r$ is a prototype feature for a component r and N is the total number of components in the training point cloud. The $k_c$ is a key representation for each category c. The $k_{\bar{c}}$ is a key representation for the ground truth category $\bar{c}$ for the component r. The $\tau$ is a temperature hyper-parameter. The system can update the key representations via a moving average with momentum as following:

$$k_{\bar{c}} \leftarrow m k_{\bar{c}} + (1-m) f_r. \tag{5}$$

In some implementations, the system can train the semantic segmentation neural network through knowledge distillation (Tung, Frederick, and Greg Mori. "Similarity-preserving knowledge distillation." *Proceedings of the IEEE/CVF International Conference on Computer Vision.* 2019). The system can, for each training point cloud, process a fused point cloud generated from the training point cloud and one or more additional point clouds captured within a time window of the training point cloud using a trained multi-frame semantic segmentation neural network (e.g., a multi-frame teacher model). The multi-frame semantic segmentation neural network has been trained to process the fused point cloud to generate a fused semantic segmentation. The fused semantic segmentation can include, for each of the plurality of points in the training point cloud, a respective fused score for each of the plurality of categories.

The multi-frame semantic segmentation neural network can take advantage of the dense points in the fused point cloud to generate fused semantic segmentation that can be more accurate than the predictions generated from a single point cloud. The training system can generate pseudo labels based on the fused output generated by the multi-frame semantic segmentation neural network. The training system can train the single frame semantic segmentation neural network (e.g., a single-frame student model) based on the pseudo label and the pseudo label can serve as additional supervision or soft targets (e.g., the fifth term in the loss function), in additional to the supervision based on the component-wise weak label (e.g., the first term in the loss function) and the point-wise sparse label (e.g., the second term in the loss function). The system can use an appropriate classification loss function to compute the fifth term in the loss function, such as a soft cross-entropy loss function. After training, the semantic segmentation neural network (e.g., the single-frame student model) can be used in an on-board system of an autonomous vehicle.

For example, the loss function can include a fifth term that measures, for each point in each training point cloud, an error between (i) the respective scores for each of the plurality of categories for the point generated by the semantic segmentation neural network (e.g., a single-frame student model) and (ii) the respective fused scores for each of the plurality of categories for the point generated by the trained multi-frame semantic segmentation neural network. For example, the fifth term in the loss function can include the following loss $l_i$ for a point i:

$$l_i = \Sigma_j p_{i,j} \log(x_{i,j}). \tag{6}$$

Here, i is an index for point i, and $p_{i,j}$ is the pseudo label (i.e., a fused score) for point i and for category j generated by the multi-frame semantic segmentation neural network, indicating a likelihood that the point i belongs to category j. The $x_{i,j}$ is the normalized score (e.g., by Softmax) for point i and for category j generated by the neural network.

For example, referring to FIG. 4, the fused scores for each of the plurality of categories for the point 416 generated by the trained multi-frame semantic segmentation neural network can be {"traffic sign: 0.4", "bicycle: 0.5", "road: 0.1"}. Although the point 416 is not a labeled point, i.e., a ground truth category label is not available for the point 416, the fused scores can serve as soft targets for training the single-frame neural network. The respective scores for each of the plurality of categories for the point 416 generated by the single-frame semantic segmentation neural network can be {"traffic sign: 0.3", "bicycle: 0.5", "road: 0.2"}. The system can use a soft cross-entropy loss to compute the fifth term that measures an error between the fused scores (soft targets) and the predicted scores generated by the single-frame semantic segmentation neural network.

The knowledge distillation technique can help improve the performance of the single-frame student model because: (i) the trained teacher model can provide additional semantic knowledge beyond the usual data supervision (e.g., the usual one-hot vectors for classification), (ii) the component-wise label can be inaccurate, and (iii) the pseudo label can provide better context information because it is generated from multiple frames of point clouds.

In some implementations, one or more of the terms in the loss function can be a weighted cross-entropy loss with categorical weights that favor underrepresented categories. The weight for an underrepresented category can be larger than the weight for a well-represented category. For example, the "bicycle" category can be an underrepresented category which occupies less points in point clouds, and therefore, the weight for the "bicycle" category in the weighted cross-entropy loss can be larger than the weight for the "ground" category. In some implementations, the categorical weight can be $$w_j = \sqrt{\frac{1}{freq_j}},$$

where $freq_j$ is the frequency of the category j in the training data.

Referring back to FIG. 5, the system updates, using the gradient, the current values of the parameters of the semantic segmentation neural network (510). The system can generate updated model parameter values based on the value of the loss function by using an appropriate updating technique, e.g., stochastic gradient descent, Adam, rmsProp, and so on. The system can then update the collection of model parameter values using the updated model parameter values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for training a semantic segmentation neural network, the method comprising:
    obtaining a batch of one or more training point clouds, wherein each training point cloud comprises a respective plurality of points, wherein, for each training point cloud, the respective plurality of points of the training point cloud are divided into a respective plurality of components;
    obtaining, for each training point cloud and for each of the respective plurality of components for the training point cloud, data identifying one or more labeled points in the component and, for each labeled point, a ground truth category for the labeled point; and
    training the semantic segmentation neural network on the batch of the one or more training point clouds, comprising:
        for each training point cloud, processing the training point cloud using the semantic segmentation neural network to generate a semantic segmentation that comprises, for each point of the respective plurality of points in the training point cloud, a respective score for each category of a plurality of categories that represents a likelihood that the point is a measurement of an object that belongs to the category;
        for each training point cloud and for each component of the respective plurality of components for the training point cloud, identifying one or more ground truth categories for the component, wherein the one or more ground truth categories for the component comprise the ground truth category for each labeled point of the one or more labeled points in the component;
        for each training point cloud and for each component of the respective plurality of components for the training point cloud, determining a subset of points in the component that are not the one or more labeled points and for which the semantic segmentation neural network generates non-zero scores for categories that are not included in the one or more ground truth categories for the component; and
        training the semantic segmentation neural network on a loss function for the batch of the one or more training point clouds, wherein the loss function includes a first term that, for each training point cloud, for each component of the respective plurality of components for the training point cloud, and for the subset of points in the component, penalizes the semantic segmentation neural network for generating the non-zero scores for the categories that are not included in the one or more ground truth categories for the component.

2. The method of claim 1, wherein the loss function includes a second term that measures, for each training point cloud and for each labeled point in each component of the plurality of components for the training point cloud that is one of the points in the training point cloud, an error between (i) the respective score for each category of the plurality of categories for the labeled point and (ii) the ground truth category for the labeled point.

3. The method of claim 1, further comprising:
    identifying, as a pure component, any component in any of the training point clouds for which all of the labeled points in the any component have a same ground truth category, wherein:
    the loss function includes a third term that measures, for each point in the training point cloud that is in a pure component, an error between (i) the respective score for each category of the plurality of categories for the point and (ii) the ground truth category for the one or more labeled points in the pure component to which the point belongs.

4. The method of claim 1, wherein
    the loss function includes a fourth term that measures, for each training point cloud, a prototype feature learning loss on prototype features for each category of the plurality of categories that, for each particular category, are generated from an intermediate output of the semantic segmentation neural network for (i) labeled points that are in the training point cloud and that have the particular category as the ground truth category and (ii) points in the training point cloud that are in a component for which all of the labeled points in the component have the particular category as the ground truth category.

5. The method of claim 1, further comprising:
    for each training point cloud, processing a fused point cloud generated from the training point cloud and one or more additional point clouds captured within a time window of the training point cloud using a trained multi-frame semantic segmentation neural network that has been trained to process the fused point cloud to generate a fused semantic segmentation that comprises, for each point of the plurality of points in the training point cloud, a respective fused score for each category of the plurality of categories, wherein the loss function includes a fifth term that measures, for each point in each training point cloud, an error between (i) the respective score for each category of the plurality of categories for the point generated by the semantic segmentation neural network and (ii) the respective fused score for each category of the plurality of categories for the point generated by the trained multi-frame semantic segmentation neural network.

6. The method of claim 1, further comprising, for each training point cloud:
providing, for presentation to a user on a user device, a visual representation of at least the respective plurality of points in the training point cloud that identifies the respective plurality of components for the training point cloud; and
obtaining, from the user device, user inputs specifying the one or more labeled points in each component of the components and, for each labeled point, the ground truth category for the labeled point.

7. The method of claim 1, further comprising:
generating the respective plurality of components for each training point cloud of the one or more training point clouds, comprising:
for each training point cloud,
generating a fused point cloud from the training point cloud and one or more additional point clouds captured within a time window of the training point cloud;
detecting ground points in the fused point cloud, wherein each ground point corresponds to a measurement of a ground in an environment;
generating a plurality of non-ground points by removing the ground points from the fused point cloud;
generating a plurality of initial components from the plurality of non-ground points; and
generating the plurality of components for the training point cloud from the ground points and the plurality of initial components.

8. The method of claim 7, wherein generating the plurality of initial components from the plurality of non-ground points comprises:
for each point, identifying, as connected points for the point, each point that is within a corresponding threshold distance of the point; and
generating the plurality of initial components from the connected points, wherein each initial component comprises a group of connected points.

9. The method of claim 8, wherein the corresponding threshold distance for each point is based on a distance from the point to a sensor that captured the training point cloud.

10. The method of claim 7, wherein generating the plurality of components for the training point cloud from the ground points and the plurality of initial components comprises:
generating one or more fixed size components that include only the ground points.

11. The method of claim 7, wherein generating the plurality of components for the training point cloud from the ground points and the plurality of initial components comprises:
dividing any initial component that exceeds a first fixed size into multiple components.

12. The method of claim 1, wherein the first term measures, for each training point cloud and for each component of the respective plurality of components for the training point cloud:
for each point of the subset of points in the component, a sum of the respective score for the point that is for categories that are not included in the one or more ground truth categories for the component.

13. A system comprising one or more computers and one or more storage devices storing instructions that are operable, when executed by the one or more computers, to cause the one or more computers to perform operations comprising:
obtaining a batch of one or more training point clouds, wherein each training point cloud comprises a respective plurality of points, wherein, for each training point cloud, the respective plurality of points of the training point cloud are divided into a respective plurality of components;
obtaining, for each training point cloud and for each of the respective plurality of components for the training point cloud, data identifying one or more labeled points in the component and, for each labeled point, a ground truth category for the labeled point; and
training a semantic segmentation neural network on the batch of the one or more training point clouds, comprising:
for each training point cloud, processing the training point cloud using the semantic segmentation neural network to generate a semantic segmentation that comprises, for each point of the respective plurality of points in the training point cloud, a respective score for each category of a plurality of categories that represents a likelihood that the point is a measurement of an object that belongs to the category;
for each training point cloud and for each component of the respective plurality of components for the training point cloud, identifying one or more ground truth categories for the component, wherein the one or more ground truth categories for the component comprise the ground truth category for each labeled point of the one or more labeled points in the component;
for each training point cloud and for each component of the respective plurality of components for the training point cloud, determining a subset of points in the component that are not the one or more labeled points and for which the semantic segmentation neural network generates non-zero scores for categories that are not included in the one or more ground truth categories for the component; and
training the semantic segmentation neural network on a loss function for the batch of the one or more training point clouds, wherein the loss function includes a first term that, for each training point cloud, for each component of the respective plurality of components for the training point cloud, and for the subset of points in the component, penalizes the semantic segmentation neural network for generating the non-zero scores for the categories that are not included in the one or more ground truth categories for the component.

14. The system of claim 13, wherein the loss function includes a second term that measures, for each training point cloud and for each labeled point in each of the plurality of components for the training point cloud that is one of the points in the training point cloud, an error between (i) the respective score for each category of the plurality of categories for the labeled point and (ii) the ground truth category for the labeled point.

15. The system of claim 13, the operations further comprise:
identifying, as a pure component, any component in any of the training point clouds for which all of the labeled points in the any component have a same ground truth category, wherein:
the loss function includes a third term that measures, for each point in the training point cloud that is in a pure component, an error between (i) the respective score for each category of the plurality of categories for the point and (ii) the ground truth category for the one or more labeled points in the pure component to which the point belongs.

16. The system of claim 13, wherein
the loss function includes a fourth term that measures, for each training point cloud, a prototype feature learning loss on prototype features for each category of the plurality of categories that, for each particular category, are generated from an intermediate output of the semantic segmentation neural network for (i) labeled points that are in the training point cloud and that have the particular category as the ground truth category and (ii) points in the training point cloud that are in a component for which all of the labeled points in the component have the particular category as the ground truth category.

17. The system of claim 13, the operations further comprise:
for each training point cloud, processing a fused point cloud generated from the training point cloud and one or more additional point clouds captured within a time window of the training point cloud using a trained multi-frame semantic segmentation neural network that has been trained to process the fused point cloud to generate a fused semantic segmentation that comprises, for each point of the plurality of points in the training point cloud, a respective fused score for each category of the plurality of categories, wherein
the loss function includes a fifth term that measures, for each point in each training point cloud, an error between (i) the respective score for each category of the plurality of categories for the point generated by the semantic segmentation neural network and (ii) the respective fused score for each category of the plurality of categories for the point generated by the trained multi-frame semantic segmentation neural network.

18. The system of claim 13, the operations further comprise, for each training point cloud:
providing, for presentation to a user on a user device, a visual representation of at least the respective plurality of points in the training point cloud that identifies the respective plurality of components for the training point cloud; and
obtaining, from the user device, user inputs specifying the one or more labeled points in each component of the components and, for each labeled point, the ground truth category for the labeled point.

19. The system of claim 13, the operations further comprise:
generating the respective plurality of components for each training point cloud of the one or more training point clouds, comprising:

for each training point cloud,
generating a fused point cloud from the training point cloud and one or more additional point clouds captured within a time window of the training point cloud;
detecting ground points in the fused point cloud, wherein each ground point corresponds to a measurement of a ground in an environment;
generating a plurality of non-ground points by removing the ground points from the fused point cloud;
generating a plurality of initial components from the plurality of non-ground points; and
generating the plurality of components for the training point cloud from the ground points and the plurality of initial components.

20. One or more non-transitory computer storage media encoded with computer program instructions that when executed by a plurality of computers cause the plurality of computers to perform operations comprising:
obtaining a batch of one or more training point clouds, wherein each training point cloud comprises a respective plurality of points, wherein, for each training point cloud, the respective plurality of points of the training point cloud are divided into a respective plurality of components;
obtaining, for each training point cloud and for each of the respective plurality of components for the training point cloud, data identifying one or more labeled points in the component and, for each labeled point, a ground truth category for the labeled point; and
training a semantic segmentation neural network on the batch of the one or more training point clouds, comprising:
for each training point cloud, processing the training point cloud using the semantic segmentation neural network to generate a semantic segmentation that comprises, for each point of the respective plurality of points in the training point cloud, a respective score for each category of a plurality of categories that represents a likelihood that the point is a measurement of an object that belongs to the category;
for each training point cloud and for each component of the respective plurality of components for the training point cloud, identifying one or more ground truth categories for the component, wherein the one or more ground truth categories for the component comprise the ground truth category for each labeled point of the one or more labeled points in the component;
for each training point cloud and for each component of the respective plurality of components for the training point cloud, determining a subset of points in the component that are not the one or more labeled points and for which the semantic segmentation neural network generates non-zero scores for categories that are not included in the one or more ground truth categories for the component; and
training the semantic segmentation neural network on a loss function for the batch of the one or more training point clouds, wherein the loss function includes a first term that, for each training point cloud, for each component of the respective plurality of components for the training point cloud, and for the subset of points in the component, penalizes the semantic segmentation neural network for generating the non-zero scores for the categories that are not included in the one or more ground truth categories for the component.

* * * * *